US008942951B2

(12) United States Patent
Moussavi

(10) Patent No.: US 8,942,951 B2
(45) Date of Patent: Jan. 27, 2015

(54) TOUCH DEVICE AND DETECTION METHOD THEREOF

(75) Inventor: Farshid Moussavi, Oakland, CA (US)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 450 days.

(21) Appl. No.: 13/311,561

(22) Filed: Dec. 6, 2011

(65) Prior Publication Data

US 2012/0310592 A1 Dec. 6, 2012

(30) Foreign Application Priority Data

Jun. 1, 2011 (CN) .......................... 2011 1 0157592

(51) Int. Cl.
G06F 15/00 (2006.01)
G06F 3/043 (2006.01)
G06F 3/0488 (2013.01)
G06F 3/041 (2006.01)

(52) U.S. Cl.
CPC .............. *G06F 3/043* (2013.01); *G06F 3/0488* (2013.01); *G06F 3/0416* (2013.01); *G06F 3/0418* (2013.01)
USPC ....... 702/150; 702/79; 455/456.1; 455/435.1; 455/575.3; 345/173; 715/863

(58) Field of Classification Search
CPC ..... G06F 3/0418; G06F 3/043; G06F 3/0488; G06F 3/0416
USPC .......... 702/79, 150; 455/456.1, 435.1, 575.3; 345/173; 715/863
See application file for complete search history.

(56) References Cited

U.S. PATENT DOCUMENTS

| RE33,151 E | 1/1990 | Adler | |
|---|---|---|---|
| 5,113,504 A * | 5/1992 | Matsuda | 714/23 |
| 2006/0293094 A1* | 12/2006 | Kilpi et al. | 455/575.3 |
| 2007/0188476 A1 | 8/2007 | Bayramoglu et al. | |
| 2008/0070572 A1* | 3/2008 | Shkedi | 455/435.1 |
| 2010/0146459 A1* | 6/2010 | Repka | 715/863 |
| 2010/0159951 A1* | 6/2010 | Shkedi | 455/456.1 |
| 2011/0074694 A1* | 3/2011 | Rapp et al. | 345/173 |
| 2011/0199327 A1* | 8/2011 | Shin et al. | 345/173 |
| 2012/0191394 A1* | 7/2012 | Uzelac et al. | 702/79 |
| 2012/0202521 A1* | 8/2012 | Shkedi | 455/456.1 |
| 2012/0310592 A1* | 12/2012 | Moussavi | 702/150 |
| 2014/0073353 A1* | 3/2014 | Shkedi | 455/456.1 |

* cited by examiner

*Primary Examiner* — Carol S Tsai
(74) *Attorney, Agent, or Firm* — Gokalp Bayramoglu

(57) ABSTRACT

A touch device includes a plurality of sensors, a storage module and a processing module. The sensors are placed on a substrate for detecting acoustic waves and generating electrical signals. The storage module stores a plurality of templates of delay measurement for a plurality of locations on the substrate. The processing module is coupled to the sensors and to the storage module for calculating a received delay measurement and comparing the received delay measurement to the plurality of templates of delay measurement to estimate touch location. A detection method for the touch device is also provided.

21 Claims, 4 Drawing Sheets

TOUCH DEVICE AND DETECTION METHOD THEREOF

BACKGROUND

This application claims the benefit of China application No. 201110157592.4, filed on Jun. 1, 2011.

TECHNICAL FIELD

The present disclosure relates to an input device, and particularly, to a touch device and a detection method of the touch device.

DISCUSSION OF RELATED ART

Touch devices have been in use for years. Typically, a touch device is composed of elements that determine a touch location on a substrate. There are a variety of touch technologies, such as resistive, infrared, surface acoustic wave, pressure, and capacitive.

The main problem with conventional resistive touch devices is slow response. Moreover, a resistive touch screen includes a conductive film for being touched, but the conductive film wears down as a result of usage.

To overcome the shortages of the resistive touch technology, infrared touch devices include infrared transmitters and receivers for detecting presence and location of a touch within the display surface having no film material. When the touch surface is touched, light from the infrared transmitters to the receivers is blocked and this blockage is detected by a touch detection algorithm at the receiver. Infrared transmitters and receivers consume a lot of power making them less likely candidates for handheld and portable applications.

Capacitive touch devices include a glass material instead of a film material for being a touch surface and the detection is based on capacitance changing locally with touch. While the above capacitive touch devices for detecting touch positions have been successful and fast, they require costly processing of the substrate with coating conductive material thereon and often need extra power consumption due to the coated conductive material. In other words, the above capacitive touch devices have a high manufacturing cost and excessive power consumption.

To overcome the shortages of the above conventional touch device, a touch device utilizing acoustic waves to determine the touch location are presented. The touch device utilizing acoustic waves includes a substrate and a plurality of ultrasonic sensors positioned around the substrate for receiving acoustic waves of touches on the substrate. The received signals are then combined together and used to indirectly estimate the position that was touched. In such touch device, material of the substrate is a raw piece of glass, saving much cost and power.

However, when the above touch device utilizing acoustic waves to detect a touch location from ultrasonic sensor readings, each measurement inherently has noise in it, and therefore there is a finite signal to noise ratio. Therefore, the estimation accuracy of the above touch device utilizing acoustic waves is decreased due to the finite signal to noise ratio.

Therefore, a new touch device is desired in order to overcome the above-described shortcomings.

SUMMARY OF THE INVENTION

In one aspect, a touch device according to a preferred embodiment includes a plurality of sensors, a storage module, and a processing module. The sensors are placed on a substrate for detecting acoustic waves and generating electrical signals. The storage module stores a plurality of average delay measurements (known as a template of delay measurements) for a plurality of locations on the substrate. The processing module is coupled to the sensors and the storage module for calculating a received delay measurement and comparing the received delay measurement to the plurality of templates of delay measurement to estimate the touch location on the substrate.

In another aspect, a touch device according to a preferred embodiment includes a plurality of sensors and a processing module. The sensors are placed on a substrate for detecting acoustic waves and converting the acoustic signals to electrical signals. The processing module receives the electrical signals and stores a plurality of templates of delay measurement for a plurality of locations on the substrate. Each template of delay measurement, corresponding to one location on the substrate, is an average of multiple measurements of the location on the substrate. The processing module further calculates touch location by comparing the received delay measurement with the plurality of templates of delay measurement.

In another aspect, a detection method for a touch device according to a preferred embodiment includes: detecting acoustic waves; converting the acoustic waves into electrical signals; calculating a received delay measurement and comparing the received delay measurement to a plurality of templates of delay measurement for a plurality of locations on a substrate to determine touch location, wherein the plurality of templates of delay measurement are taken during a calibration process, further wherein each template of delay measurement, corresponding to one location on the substrate, is an average of multiple measurements of the location on the substrate during the calibration process.

Other advantages and novel features will become more apparent from the following detailed description of various embodiments, when taken in conjunction with the accompanying drawings.

BRIEF DESCRIPTION OF THE DRAWINGS

Components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION OF THE PREFERRED EMBODIMENTS

The disclosure is illustrated by way of an example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
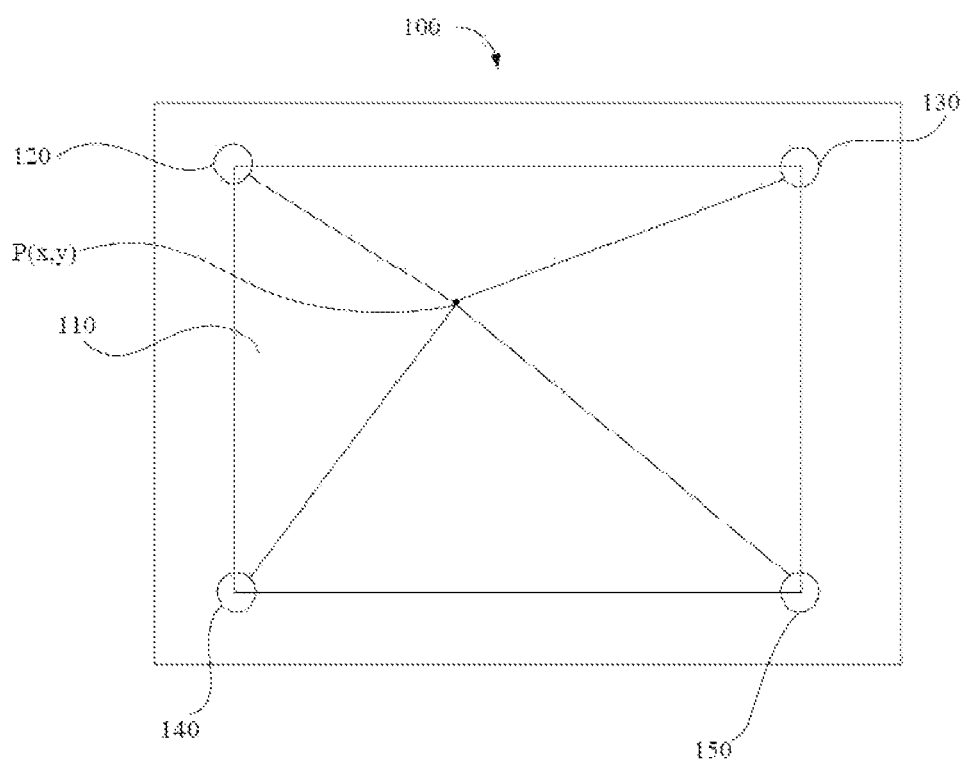
FIG. 1 is a schematic top view of a touch device including a substrate, a plurality of sensors, a storage module, and a processing module.
Figure 2:
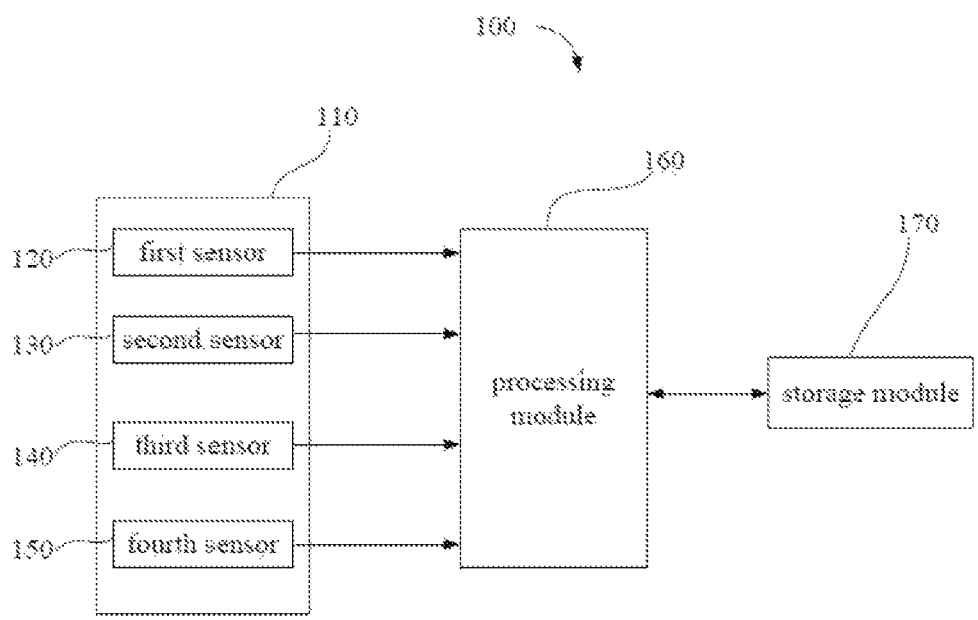
FIG. 2 is a schematic block diagram of the touch device shown in FIG. 1.

Referring to FIGS. 1 and 2, a touch device 100 in accordance with a preferred embodiment of the present disclosure is shown. The touch device 100 includes a substrate 110, a first sensor 120, a second sensor 130, a third sensor 140, a fourth sensor 150, a processing module 160, and a storage module 170. The substrate 110 is made of any material that is capable of propagating bending waves, such that a touch on the surface of the substrate 110 can generates acoustic waves. In this embodiment, the substrate 110 is made of glass. The first sensor 120, the second sensor 130, the third sensor 140, and the fourth sensor 150 are placed on adjoining four corners of the substrate 110. The first sensor 120, the second sensor 130, the third sensor 140 and the fourth sensor 150 detect acoustic waves generated on the substrate 110, and generate electrical signals according to received acoustic energy. The processing module 160 is connected to the first sensor 120, the second sensor 130, the third sensor 140 and the fourth sensor 150, and calculates a received delay measurement of a touch location P according to the electrical signals. The processing module 160 further compares the received delay measurement with a plurality of templates of delay measurement to estimate the touch location P on the substrate 110. The received delay measurement is a set of arrival time differences for the acoustic waves from the touch location P to the first sensor 120, the second sensor 130, the third sensor 140 and the fourth sensor 150. The storage module 170, connected to the processing module 160, is configured for storing a plurality of templates of delay measurement for a plurality of locations on the substrate 10. Each template of delay measurements, corresponding to one location on the substrate 10, is an average of N measurements of the location obtained during a calibration process.

Figure 3:
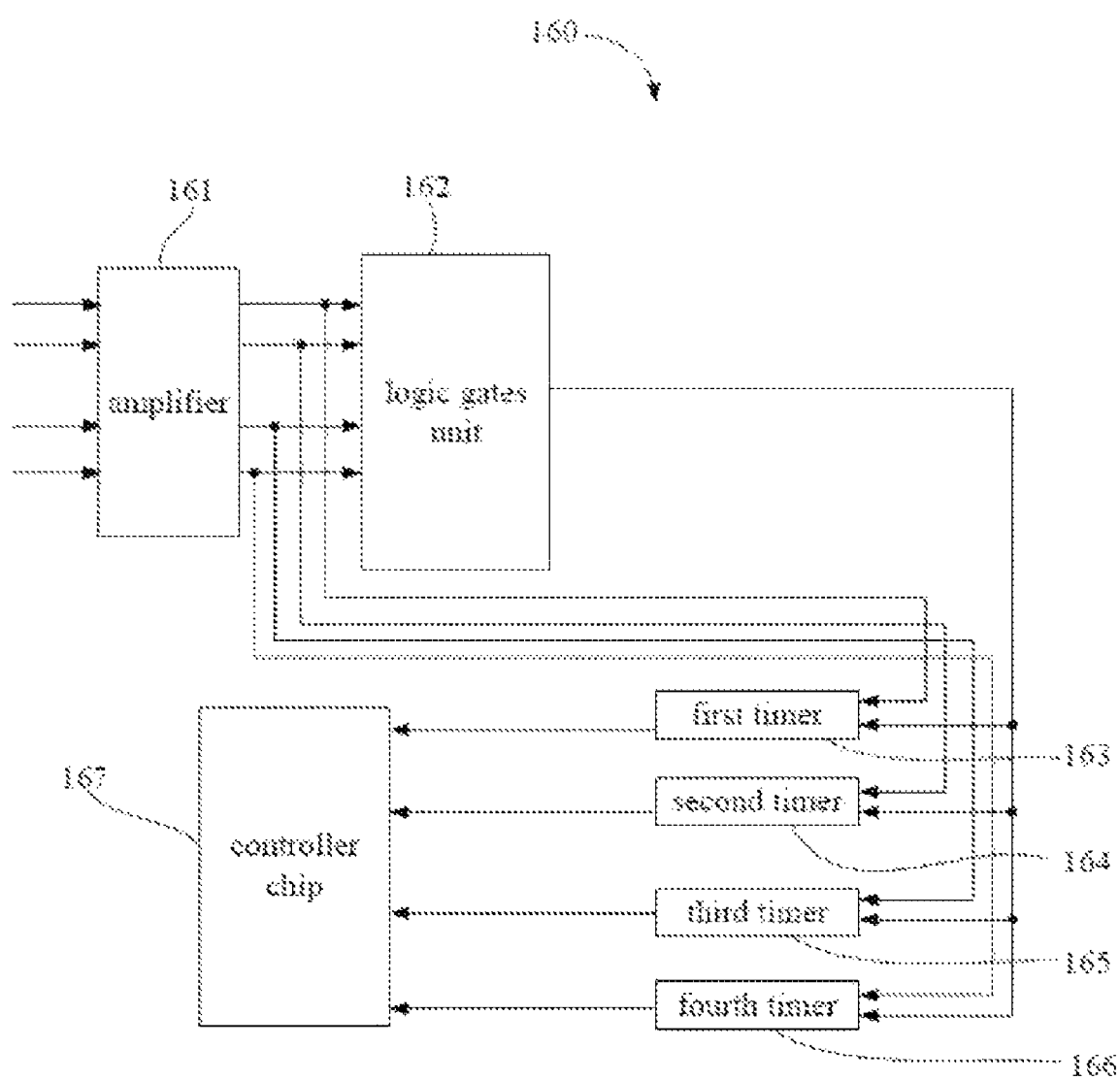
FIG. 3 is a schematic block diagram of the processing module shown in FIG. 1.

Referring to FIG. 3, in the illustrated embodiment, the processing module 160 includes an amplifier 161, a logic gate unit 162, a first timer 163, a second timer 164, a third timer 165, a fourth timer 166, and a controller chip 167. The electrical signals coming from the first sensor 120, the second sensor 130, the third sensor 140 and the fourth sensor 150 are amplified by the amplifier 161. Outputs from the amplifier 161 are transmitted to the logic gate unit 162. Outputs of the logic gate unit 162 are applied to the first timer 163, the second timer 164, the third timer 165 and the fourth timer 166 to detect the time differences used for determining the touch location P. The first timer 163, the second timer 164, the third timer 165, and the fourth timer 166 are used to measure time differences between acoustic waves that arrive from the first sensor 120, the second sensor 130, the third sensor 140 and the fourth sensor 150 at different times. The controller chip 167 is used to perforin calculations, which are communicated to the storage module 170. Coordinates of the touch location P are calculated by the controller chip 167 upon comparing the stored templates of delay measurement and the time differences received from the timers.

In another embodiment, the first timer 163, the second timer 164, the third timer 165, and the fourth timer 166 can be inside the controller chip 167. The controller chip 167 can be any microcontroller that is capable of executing codes at a given speed, and capable of being incorporated into an application specific integrated circuit or into a field programmable gate array. Therefore, the amplifier 161, the logic gate unit 162, the first timer 163, the second tuner 164, the third timer 165, and the fourth timer 166 can also be omitted, and correspondingly, the electrical signals coming from the first sensor 120, the second sensor 130, the third sensor 140, and the fourth sensor 150 can be directly transmitted to the controller chip 167.

When a user touches location P of the substrate 110, acoustic waves are generated from the location P. The first sensor 120, the second sensor 130, the sensor 140, and the fourth sensor 150 detect the generated acoustic waves from different locations, and transmit the respective electrical signals to the amplifier 161. The amplifier 161 amplifies the electrical signals, and applies the amplified electrical signals to the logic gate unit 162. Outputs of the logic gate unit 162 are applied to the first timer 163, the second timer 164, the third timer 165, and the fourth timer 166 as trigger signals. In this way, whichever electrical signal arrives first at any one of the first timer 163, the second timer 164, the third timer 165, and the fourth timer 166, acts as the trigger to start all of the first timer 163, the second timer 164, the third timer 165, and the fourth timer 166. The first timer 163, the second timer 164, the third tinier 165, and the fourth timer 166 start counting upon an input electrical signal reaching a certain threshold level, and stop running when the other input electrical signals reach a certain threshold level. When all of the first timer 163, the second timer 164, the third timer 165, and the fourth timer 166 stop, the time that they hold will be equivalent to the time difference of acoustic wave arrivals to different sensors. In other words, the time differences between the arrivals of two signals are measured by the first timer 163, the second timer 164, the third timer 165, and the fourth timer 166 respectively. The received delay measurement composed of the time differences measured between different sensors can be used to estimate the touch location P on the substrate 110. The controller chip 167 compares the received delay measurement to the previously stored templates of delay measurement, and finds coordinates of the touch location P.

In this embodiment, each stored template of delay measurement is a set of four numbers, one for each sensor. For example, when the first sensor 120 firstly receives the acoustic waves from the touch location P, the received delay measurement is (0, t2, t3, t4), wherein t2 represents time difference between the first sensor 120 and the second sensor 130, t3 represents time difference between the first sensor 120 and the third sensor 140, and t4 represents time difference between the first sensor 120 and the fourth sensor 150. If the received delay measurement is substantially the same as a template of delay measurement in the storage module, the touch location P will be declared as the location corresponding to the template of delay measurement, or if the storage module has a template of delay measurement that is most similar to the received delay measurement, the touch location P will be declared as the location corresponding to the template of delay measurement.

As each delay measurement has noise in it, there is a finite signal to noise ratio in the delay measurement impacting the accuracy of templates of delay measurement. Therefore, a comparison error between the received delay measurement and the template of delay measurement may be incurred during comparison process resulting in determination of accuracy of the touch location P, which in turn depends on accuracy of templates of delay measurement. However, each template of delay measurement of the disclosure is an average of multiple delay measurements, such that the signal to noise ratio increases by an average of n measurements based on the decrease in the noise, thereby improving the accuracy of templates of delay measurement. Accordingly, the estimation accuracy of the touch device 100 increases.

Furthermore, the touch device 100 detects the touch signal by the first sensor 120, the second sensor 130, the third sensor 140, and the fourth sensor 150, and therefore electrical material is not required in the substrate 110. Therefore, the touch device 100 does not require costly processing in the substrate 110 and extra power consumption due to the embedded electrical material.

Figure 4:
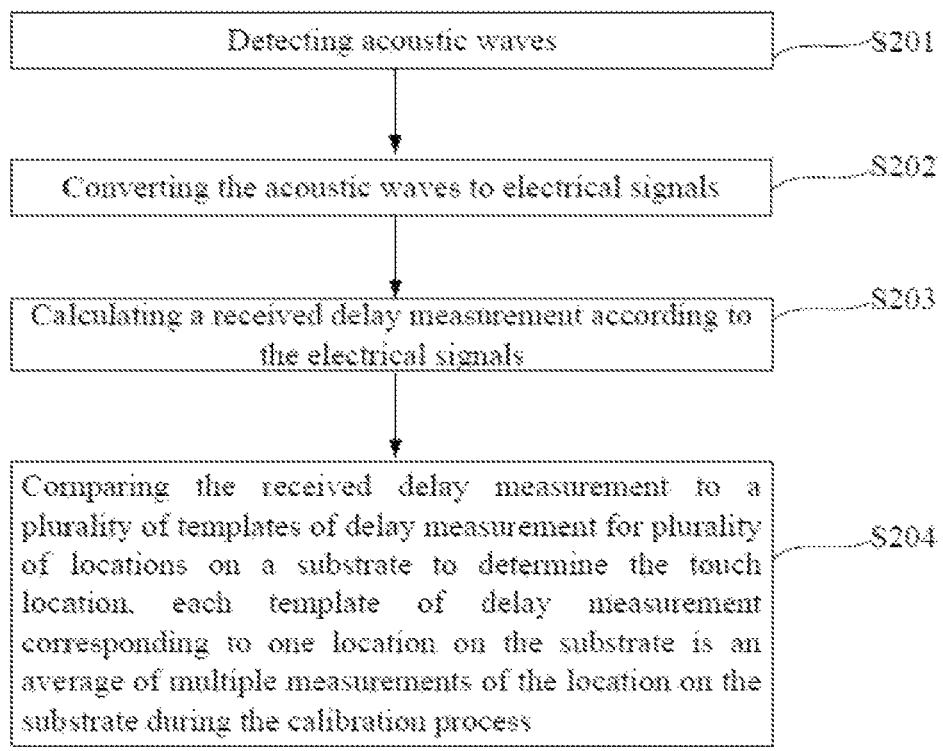
FIG. 4 is a flowchart of a detection method of the touch device shown in FIG. 1.

Referring to FIG. 4, a preferred embodiment of detection method of the touch device 100 includes the following steps.

In step S201, acoustic waves are detected when the substrate 110 is touched. In an embodiment, the touch location P of the substrate 110 is touched during normal operation. The touch location P may be a virtual key of the touch device 100.

In step S202, the acoustic waves are converted into electrical signals. The first sensor 120, the second sensor 130, the third sensor 140, and the fourth sensor 150 detect the acoustic waves from the touch location P and generate electrical signals according to the acoustic waves.

In step S203, a received delay measurement is calculated according to the electrical signals.

In step S204, the received delay measurement is compared to a plurality of templates of delay measurement for a plurality of locations on the substrate 110 to determine or estimate the touch location P. In an embodiment, the arrival time differences of the touch location P between the first sensor 120, the second sensor 130, the third sensor 140, and the fourth sensor 150 are measured, and thus a delay measurement of the touch location is obtained according to the arrival time differences.

The templates of delay measurement of the plurality of locations on the substrate 110 are stored in the storage module 170 during the calibration process. The templates of delay measurement are measured by the following method.

Firstly, each location of the substrate 110 is touched N times, and the arrival time differences of acoustic waves of each location between the first sensor 120, the second sensor 130, the third sensor 140 and the fourth sensor 150 are accordingly measured each of those N times. In other words, the delay measurement of each location is independently measured N times. In one embodiment, N is equal to 50. In another embodiment, N is equal to 100.

Secondly, the delay measurements of N times of each location are averaged by the controller chip 167 of the processing module 160.

Finally, the averaged delay measurement of each location of the substrate 110 is defined as a template of delay measurement. The templates of delay measurement of the plurality of locations on the substrate 110 are stored in the storage module 170.

During the comparison process, the delay measurement of the touch location may be substantially same as or most similar to one of the templates of delay measurement. The touch location is estimated based on the comparison result. If the delay measurement of the touch location is substantially the same as or most similar to a template of delay measurement, the touch location P will be declared as the location corresponding to the template of delay measurement.

It should be noted that the templates of delay measurements are measured in a calibration process. During the calibration process, a tester touches a same location on the substrate 110 N times. This is accomplished by a quick calibration process either during manufacturing or when the touch device is set up by the user.

It is to be understood that the number of sensors can also be more than four on other preferred embodiments. The first sensor 120, the second sensor 130, the sensor 140, and the fourth sensor 150 can also be placed on four sides of the substrate 110, such as the adjoining four corners of the substrate 100. The storage module 170 can also be omitted, and correspondingly, the templates of delay measurement can be stored in the processing module 160.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. A touch device, comprising:
   a plurality of sensors placed on a substrate for detecting acoustic waves and generating electrical signals;
   a storage module for storing a plurality of templates of delay measurement for a plurality of locations on the substrate, wherein each template of delay measurement, corresponding to one location on the substrate, is an average of multiple measurements of the location on the substrate during calibration process; and
   a processing module coupled to the plurality of sensors and to the storage module for calculating a received delay measurement and comparing the received delay measurement with the plurality of templates of delay measurement to estimate touch location on the substrate.

2. The touch device of claim 1, wherein the plurality of sensors are placed on adjoining four corners of the substrate.

3. The touch device of claim 1, wherein the substrate is made of glass.

4. The touch device of claim 1, wherein the processing module comprises an amplifier.

5. The touch device of claim 1, wherein the processing module comprises a plurality of timers.

6. The touch device of claim 5, wherein the processing module further comprises a logic gate unit interconnecting the plurality of timers and the amplifier.

7. The touch device of claim 1, wherein the processing module further comprises a controller chip performing the comparison of the received delay measurement with the plurality of templates of delay measurement, further wherein the controller chip communicates with the storage module.

8. The touch device of claim 1, wherein when the received delay measurement is substantially same as a template of delay measurement in the storage module, the touch location will be declared as location corresponding to the template of delay measurement.

9. The touch device of claim 1, wherein when the storage module has a template of delay measurement that is most similar to the received delay measurement, the touch location will be declared as location corresponding to the template of delay measurement.

10. A touch device; comprising:
    a plurality of sensors placed on a substrate for detecting acoustic waves and converting the acoustic signals to electrical signals;
    a processing module receiving the electrical signals and storing a plurality of templates of delay measurement for a plurality of locations on the substrate, wherein each template of delay measurement corresponding to one location on the substrate is an average of multiple measurements of the location on the substrate, wherein the processing module calculates a touch location by comparing received delay measurement to the plurality of templates of delay measurement, wherein the touch location is calculated by means of calculating the received delay measurement according to the electrical signals.

11. The touch device of claim 10, wherein the sensors are placed on adjoining four corners of the substrate.

12. The touch device of claim 10, wherein the substrate is made of glass.

13. The touch device of claim 10, wherein the processing module comprises an amplifier.

14. The touch device of claim 10, wherein the processing module further comprises a plurality of timers.

15. The touch device of claim 14, wherein the processing module further comprises a logic gate unit interconnecting the plurality of timers and the amplifier.

16. The touch device of claim 15, wherein the processing module further comprises a controller chip.

17. The touch device of claim 10, wherein when the received delay measurement is substantially same as a template of delay measurement in the storage module, the touch location will be declared as location corresponding to the template of delay measurement.

18. The touch device of claim 10, wherein when the processing module has a template of delay measurement that is most similar to the received delay measurement, the touch location will be declared as location corresponding to the template of delay measurement.

19. A detection method of a touch device, comprising:
   detecting acoustic waves;
   converting the acoustic waves to electrical signals;
   calculating a received delay measurement; and
   comparing the received delay measurement to a plurality of templates of delay measurement for plurality of locations on a substrate to determine the touch location, wherein the plurality of templates of delay measurement were taken during a calibration process, further wherein each template of delay measurement, corresponding to one location on the substrate, is an average of multiple measurements of the location on the substrate during the calibration process.

20. The detection method of a touch device of claim 19, wherein when the received delay measurement is substantially same as a template of delay measurement in the storage module, the touch location will be declared as location corresponding to the template of delay measurement.

21. The detection method of a touch device of claim 19, wherein when the storage module has a template of delay measurement that is most similar to the received delay measurement, the touch location will be declared as location corresponding to the template of delay measurement.

* * * * *